United States Patent
Kim et al.

(10) Patent No.: US 9,477,110 B2
(45) Date of Patent: Oct. 25, 2016

(54) DISPLAY DEVICE AND MANUFACTURING METHOD THEREOF

(71) Applicant: Samsung Display Co., Ltd., Yongin, Gyeonggi-Do (KR)

(72) Inventors: Tae Gyun Kim, Seoul (KR); Hyoung Sub Lee, Yongin-si (KR); Tae Woon Cha, Seoul (KR); Woo Yong Sung, Seoul (KR)

(73) Assignee: Samsung Display Co., Ltd. (KR)

( * ) Notice: Subject to any disclaimer, the term of this patent is extended or adjusted under 35 U.S.C. 154(b) by 81 days.

(21) Appl. No.: 14/264,939

(22) Filed: Apr. 29, 2014

(65) Prior Publication Data

US 2015/0138469 A1 May 21, 2015

(30) Foreign Application Priority Data

Nov. 21, 2013 (KR) ........................ 10-2013-0142250

(51) Int. Cl.
*G02F 1/1333* (2006.01)
*G02F 1/1341* (2006.01)

(52) U.S. Cl.
CPC ....... *G02F 1/133377* (2013.01); *G02F 1/1341* (2013.01)

(58) Field of Classification Search
CPC ........................ G02F 1/133377; G02F 1/1341
See application file for complete search history.

(56) References Cited

U.S. PATENT DOCUMENTS

| | | | |
|---|---|---|---|
| 6,469,761 B1 | 10/2002 | Drabik et al. | |
| 6,689,632 B2 | 2/2004 | Kim et al. | |
| 6,995,890 B2 | 2/2006 | Lin | |
| 8,203,686 B2 | 6/2012 | Hatano et al. | |
| 8,294,850 B2 | 10/2012 | Chen et al. | |
| 2010/0165269 A1* | 7/2010 | Nara | G02F 1/1303 349/106 |
| 2013/0126468 A1 | 5/2013 | Kim et al. | |
| 2013/0182203 A1* | 7/2013 | Lee | G02F 1/133377 349/106 |
| 2013/0222936 A1* | 8/2013 | Kawanishi | G02B 5/223 359/891 |
| 2014/0139795 A1* | 5/2014 | Ryu | G02F 1/1341 349/139 |
| 2014/0160419 A1* | 6/2014 | Lee | G02F 1/1341 349/154 |

FOREIGN PATENT DOCUMENTS

| | | |
|---|---|---|
| KR | 10-0426680 | 3/2004 |
| KR | 10-2011-0042900 | 4/2011 |
| KR | 10-1074077 | 10/2011 |
| KR | 10-2013-0026272 | 3/2013 |

\* cited by examiner

*Primary Examiner* — Richard Kim
*Assistant Examiner* — Kendrick Hsu
(74) *Attorney, Agent, or Firm* — Innovation Counsel LLP

(57) ABSTRACT

A display device is provided. The display device includes a substrate including a plurality of pixel areas; a thin film transistor disposed on the substrate; a first insulating layer disposed on the thin film transistor; a pixel electrode connected to the thin film transistor and disposed on the first insulating layer; a common electrode separated from the pixel electrode with a microcavity interposed therebetween; a second insulating layer disposed on the common electrode; a roof layer disposed on the second insulating layer; a hydrophobic layer disposed on the roof layer and including a plurality of protrusions; an injection hole disposed in the common electrode, the second insulating layer, and the roof layer, the injection hole exposing a portion of the microcavity; a liquid crystal layer for filling the microcavity; and an overcoat formed on the roof layer and covering the injection hole, so as to seal the microcavity.

10 Claims, 12 Drawing Sheets

DISPLAY DEVICE AND MANUFACTURING METHOD THEREOF

CROSS-REFERENCE TO RELATED APPLICATION

This application claims priority to and the benefit of Korean Patent Application No. 10-2013-0142250 filed in the Korean Intellectual Property Office on Nov. 21, 2013, the entire contents of which are incorporated herein by reference.

BACKGROUND (a) Technical Field

The present disclosure relates to a display device and a manufacturing method thereof.

(b) Description of the Related Art

A liquid crystal display, which is presently one of the most widely used flat panel displays, typically includes two substrates with field generating electrodes (such as a pixel electrode and a common electrode) and a liquid crystal layer interposed therebetween. An image is displayed by controlling an amount of transmitted light in the liquid crystal display. The amount of transmitted light is controlled based on an alignment of the liquid crystal molecules in the liquid crystal layer under the influence of an electric field (generated by applying a voltage to the field generating electrodes).

Typically, two sheets of display panels may be used as the substrates of the liquid crystal display. The two sheets may include a thin film transistor array panel and an opposing display panel. The thin film transistor array panel may include a gate line for transferring a gate signal and a data line for transferring a data signal, whereby the gate line and the data line are formed crossing each other. The thin film transistor array panel may further include a thin film transistor connected with the gate line and the data line, and a pixel electrode connected with the thin film transistor. The opposing display panel may include a light blocking member, a color filter, and a common electrode. In some particular instances, the light blocking member, the color filter, and the common electrode may be formed on the thin film transistor array panel instead of the opposing display panel.

As mentioned above, two sheets of display panels (i.e. two substrates) are typically used in a conventional liquid crystal display, with the constituent elements of the liquid crystal display formed on the respective substrate sheet. Accordingly, the conventional liquid crystal display may be heavy and have a thick form factor. Furthermore, the cost of a conventional liquid crystal display may be high since more materials are being used (and also longer processing time since the two substrates have be to processed separately).

In manufacturing a conventional liquid crystal display, liquid crystal is typically applied at a liquid crystal injection hole and injected into a microcavity after formation of a roof layer. In some instances, some of the liquid crystal may remain on the roof layer, thereby causing light leakage.

To reduce the light leakage, a hydrophobic treatment may be applied to a top surface of the roof layer, and the remaining liquid crystal may then be removed using, for example, an air blowing method. However, in some instances, the liquid crystal injection hole may be inadvertently subject to the hydrophobic treatment, causing the liquid crystal injection hole to be hydrophobic, which subsequently interferes with the injection of the liquid crystal into the microcavity. Furthermore, in some instances, the hydrophobic chemical surface treatment on the roof layer surface may cause defects in the alignment layer of the microcavity.

SUMMARY

The present disclosure is directed to address at least the above issues relating to display device form factor, light leakage, and the hydrophobic treatment of roof layers.

According to some embodiments of the inventive concept, a display device is provided. The display device includes a substrate including a plurality of pixel areas; a thin film transistor disposed on the substrate; a first insulating layer disposed on the thin film transistor; a pixel electrode connected to the thin film transistor and disposed on the first insulating layer; a common electrode separated from the pixel electrode with a microcavity interposed therebetween; a second insulating layer disposed on the common electrode; a roof layer disposed on the second insulating layer; a hydrophobic layer disposed on the roof layer and including a plurality of protrusions; an injection hole disposed in the common electrode, the second insulating layer, and the roof layer, the injection hole exposing a portion of the microcavity; a liquid crystal layer for filling the microcavity; and an overcoat formed on the roof layer and covering the injection hole, so as to seal the microcavity.

In some embodiments, the protrusions may render a surface of the hydrophobic layer hydrophobic.

In some embodiments, an angle between the protrusions and a top surface of the roof layer may be substantially greater than about 70 degrees.

In some embodiments, a surface of the microcavity may be hydrophilic.

In some embodiments, the protrusions may form a predetermined nanopattern.

In some embodiments, the protrusions and the overcoat may be formed of a same material.

In some embodiments, a material of the protrusions may include an imprint resin.

In some embodiments, the second insulating layer may include at least one of silicon nitride, silicon oxide, and silicon oxynitride.

In some embodiments, the display device may further include a third insulating layer disposed on the roof layer.

In some embodiments, the third insulating layer may include at least one of silicon nitride, silicon oxide, and silicon oxynitride.

According to some other embodiments of the inventive concept, a method for manufacturing a display device is provided. The method includes forming a thin film transistor on a substrate; forming a first insulating layer on the thin film transistor; forming a pixel electrode connected to the thin film transistor on the first insulating layer; forming a sacrificial layer on the pixel electrode; forming a common electrode on the sacrificial layer; forming a second insulating layer on the common electrode; forming a roof layer by applying an organic material to the second insulating layer; forming a hydrophobic layer including a plurality of protrusions on the roof layer; patterning the roof layer and the hydrophobic layer, and etching and exposing the sacrificial layer with respect to the patterned roof layer and the hydrophobic layer; forming a microcavity between the pixel electrode and the common electrode by removing the exposed sacrificial layer; forming a liquid crystal layer by injecting a liquid crystal material into the microcavity; and sealing the microcavity by forming an overcoat on the roof layer.

In some embodiments, the hydrophobic layer may be formed by a nanoimprint process.

In some embodiments, an angle between the protrusions and a top surface of the roof layer may be substantially greater than about 70 degrees, and the protrusions may render a surface of the hydrophobic layer hydrophobic.

In some embodiments, the nano imprint process may further include applying a resin to the roof layer by using a nanoimprint mold, and hardening the applied resin.

In some embodiments, the hardening of the applied resin may include heat hardening or UV hardening.

In some embodiments, the protrusions may form a predetermined nanopattern.

In some embodiments, the protrusions and the overcoat may be formed of a same material.

In some embodiments, the second insulating layer may include at least one of silicon nitride, silicon oxide, and silicon oxynitride.

In some embodiments, the method may further include forming a third insulating layer on the roof layer.

In some embodiments, the third insulating layer may include at least one of silicon nitride, silicon oxide, and silicon oxynitride.

DETAILED DESCRIPTION OF THE EMBODIMENTS

Figure 1:
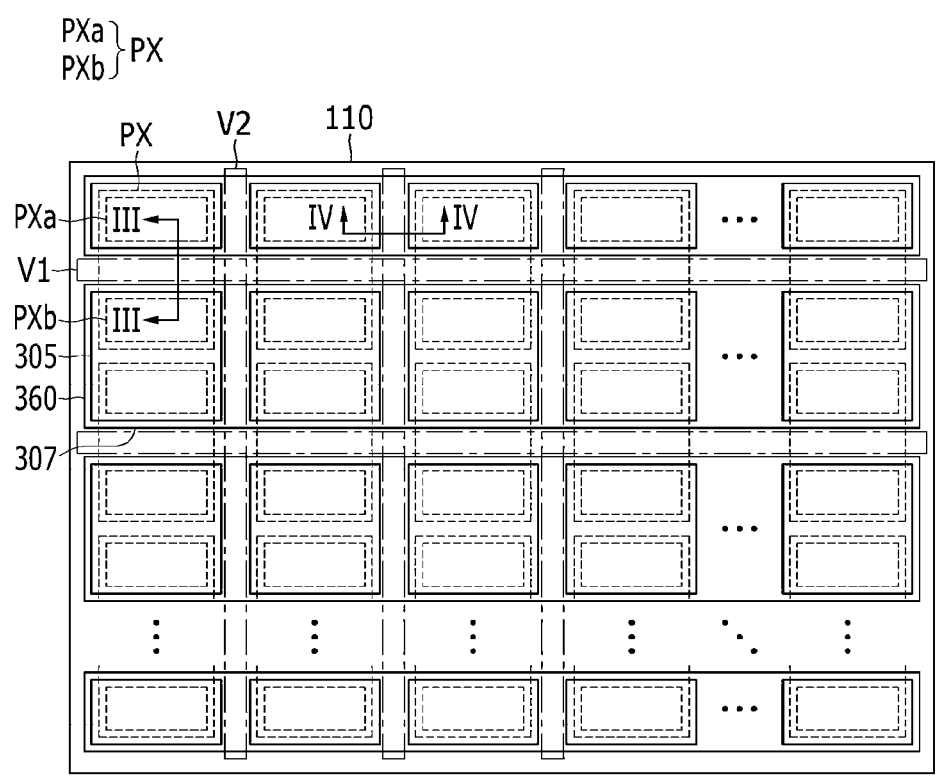
FIG. 1 shows a top plan view of a display device according to an exemplary embodiment of the inventive concept.

The present inventive concept will be described more fully herein with reference to the accompanying drawings, in which exemplary embodiments of the inventive concept are shown. As those skilled in the art would realize, the described embodiments may be modified in various different ways without departing from the spirit or scope of the present disclosure.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be disposed directly on the other element or with one or more intervening elements being present. In contrast, when an element is referred to as being "directly on" another element, there are no intervening elements present.

FIG. 1 shows a top plan view of a display device according to an exemplary embodiment of the inventive concept.

The display device includes a substrate 110 formed of glass or plastic. The substrate 110 includes a plurality of pixel areas (PX). The pixel areas (PX) may be disposed as a matrix including a plurality of pixel rows and a plurality of pixel columns. Each pixel area (PX) may include a first sub-pixel area (PXa) and a second sub-pixel area (PXb). As shown in FIG. 1, the first sub-pixel area (PXa) and the second sub-pixel area (PXb) may be disposed on the substrate 110 from top to bottom.

A first valley (V1) is disposed between the first sub-pixel area (PXa) and the second sub-pixel area (PXb) in the pixel row direction, and a second valley (V2) is disposed between the pixel columns.

It should be noted that the above-described configuration of the display device is merely exemplary and can be modified in various ways. For example, the locations of the pixel areas (PX), the first valley (V1), and the second valley (V2) may be modified accordingly by those skilled in the art. In some embodiments, common electrodes 270 (that are disposed on different pixel rows) can be connected at a point where the first valley (V1) and the second valley (V2) cross.

Next, a pixel of a display device according to an exemplary embodiment of the inventive concept will be described with reference to FIGS. 1 to 4.

Figure 2:
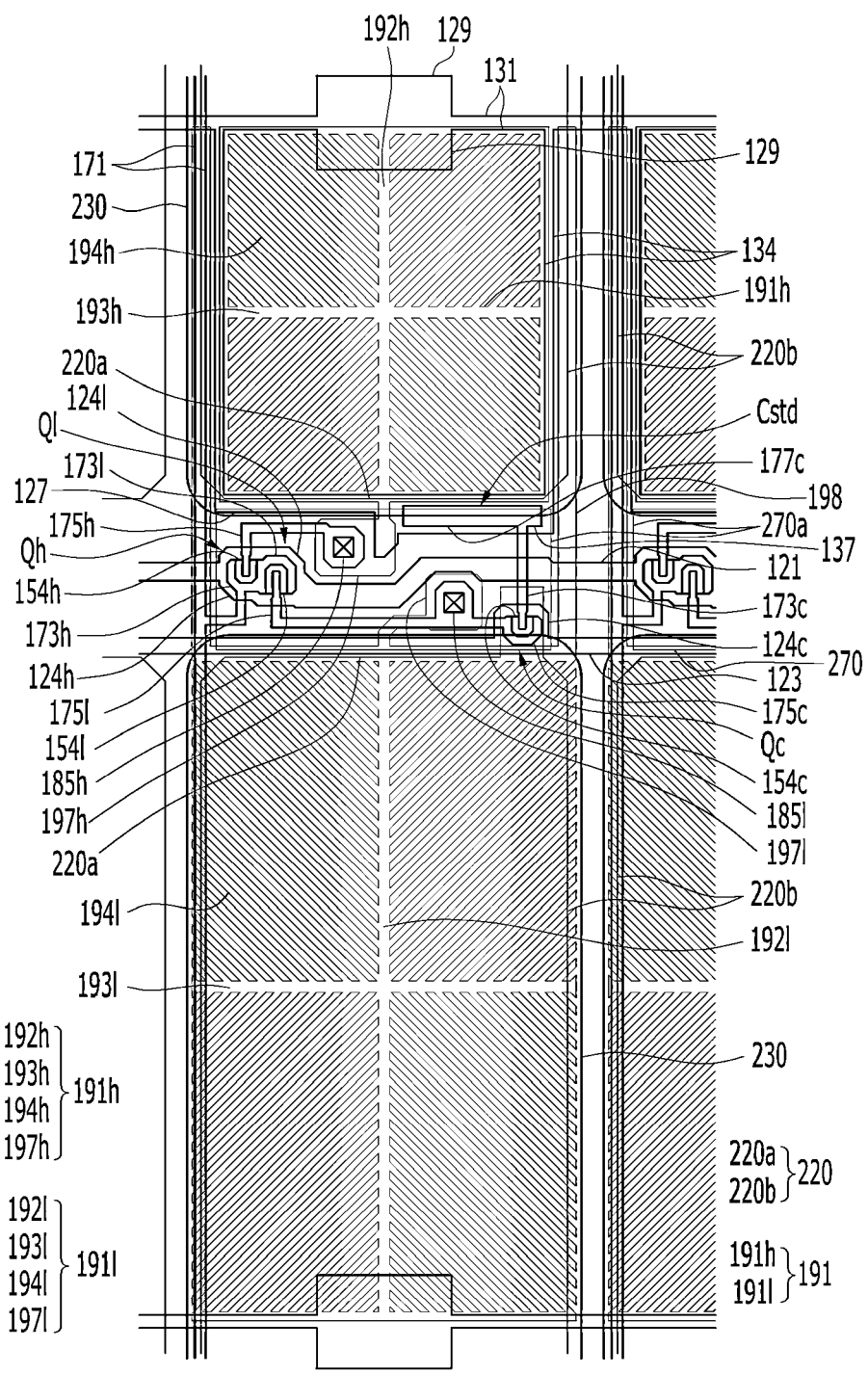
FIG. 2 shows a top plan view of a pixel of a display device according to an exemplary embodiment of the inventive concept.
Figure 3:
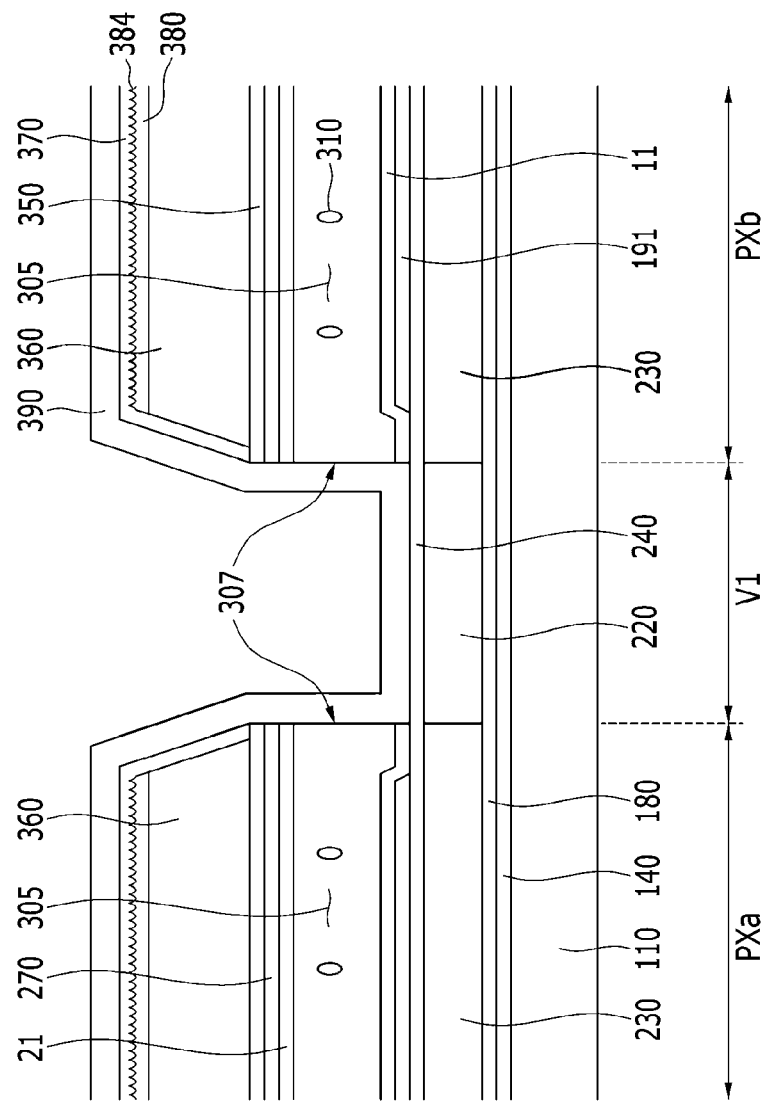
FIG. 3 shows a cross-sectional view of the display device along line III-III of FIG. 1.
Figure 4:
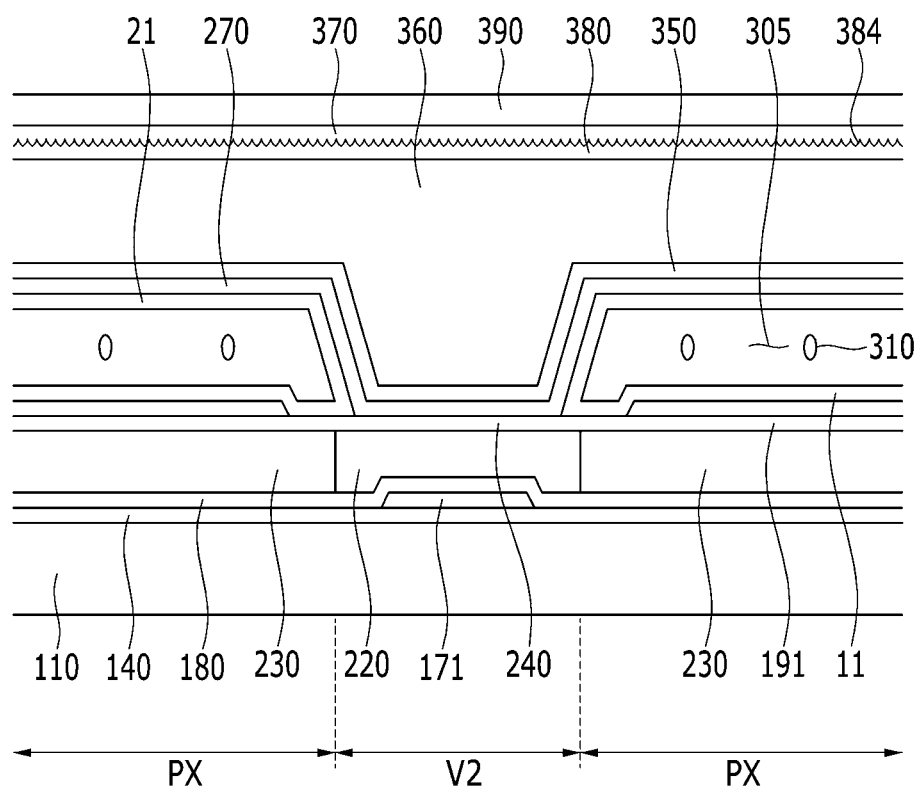
FIG. 4 shows a cross-sectional view of the display device along line IV-IV of FIG. 1.
Figure 5:
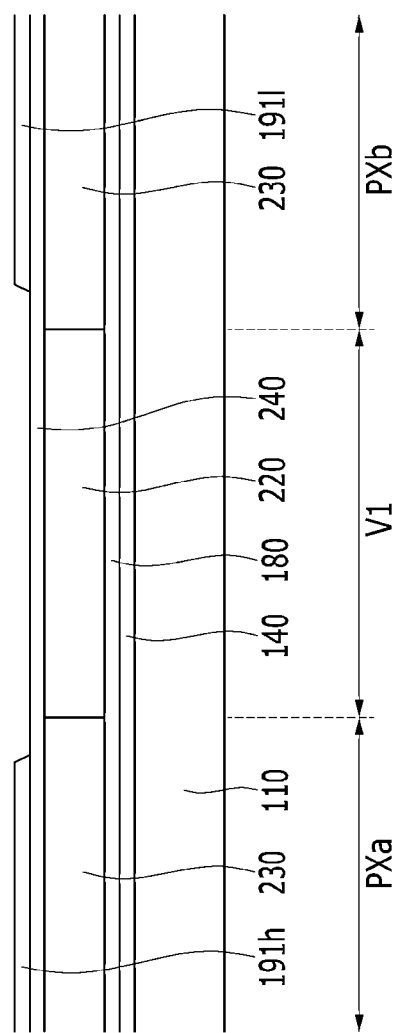
FIGS. 5 to 9 show cross-sectional views of the display device along line III-III of FIG. 1 at different stages of fabrication according to an exemplary method of manufacturing the display device.

FIG. 2 shows a top plan view of a pixel of a display device according to an exemplary embodiment of the inventive concept. FIG. 3 shows a cross-sectional view of the display device along line III-III of FIG. 1. FIG. 4 shows a cross-sectional view of the display device along line IV-IV of FIG. 1.

Referring to FIG. 2, a plurality of gate conductors including a plurality of gate lines 121, a plurality of step-down gate lines 123, and a plurality of storage electrode lines 131 are formed on the substrate 110.

The gate line 121 and the step-down gate line 123 transmit a gate signal and extend primarily in a horizontal direction. The gate conductors further include a first gate electrode 124h and a second gate electrode 124l protruding upward and downward respectively from the gate line 121, and a third gate electrode 124c protruding upward from the step-down gate line 123. The first gate electrode 124h and the second gate electrode 124l are connected to each other to form a protrusion. It should be noted that the protrusions of the first, second, and third gate electrodes 124h, 124l, and 124c can be changed having different shapes.

The storage electrode line 131 transmits a predetermined voltage (such as the common voltage (Vcom)) and extends primarily in a horizontal direction. The storage electrode line 131 includes a storage electrode 129 protruding upward and downward from the storage electrode line 131, a pair of vertical units 134 extending substantially perpendicular to the gate line 121, and a horizontal unit 127 connecting the ends of the vertical units 134. The horizontal unit 127 includes a capacitor electrode 137 extending downward from the horizontal unit 127.

Referring to FIGS. 2-4, a gate insulating layer 140 is formed on the gate conductors 121, 123, 124h, 124l, 124c, and 131. The gate insulating layer 140 may be formed of an inorganic insulating material (such as silicon nitride ($SiN_x$), silicon oxide ($SiO_x$), or silicon oxynitride ($SiO_xN_y$)). Furthermore, the gate insulating layer 140 may be formed as a single layer, or as a multi-layered structure comprising multiple layers.

A first semiconductor 154h, a second semiconductor 154l, and a third semiconductor 154c are formed on the gate insulating layer 140. The first semiconductor 154h may be formed on the first gate electrode 124h, the second semiconductor 154*l* may be formed on the second gate electrode 124*l*, and the third semiconductor 154*c* may be formed on the third gate electrode 124*c*. The first semiconductor 154*h* may be connected to the second semiconductor 154*l*, and the second semiconductor 154*l* may be connected to the third semiconductor 154*c*. Also, the first semiconductor 154*h* may extend to a bottom part of a data line 171. The first to third semiconductors 154*h*, 154*l*, and 154*c* may be formed of amorphous silicon, polycrystalline silicon, or a metal oxide.

An ohmic contact (not shown) can be formed on each of the first to third semiconductors 154*h*, 154*l*, and 154*c*. The ohmic contact can be formed of a material such as n+ hydrogenated amorphous silicon doped with silicide or a high concentration of an n-type impurity.

A plurality of data conductors are formed on the first to third semiconductors 154*h*, 154*l*, and 154*c*. The data conductors include the data line 171, a first source electrode 173*h*, a second source electrode 173*l*, a third source electrode 173*c*, a first drain electrode 175*h*, a second drain electrode 175*l*, and a third drain electrode 175*c*.

The data line 171 transmits a data signal, and extends primarily in a vertical direction crossing the gate line 121 and the step-down gate line 123. The data line 171 includes the first source electrode 173*h* and the second source electrode 173*l* extending toward the first gate electrode 124*h* and the second gate electrode 124*l*, respectively, and the first source electrode 173*h* and the second source electrode 173*l* are connected to each other.

Each of the first drain electrode 175*h*, second drain electrode 175*l*, and third drain electrode 175*c* includes a wide first end portion and a bar-type second end portion. The bar-type second end portions of the first drain electrode 175*h* and the second drain electrode 175*l* are partially surrounded by the first source electrode 173*h* and the second source electrode 173*l*. The wide first end portion of the second drain electrode 175*l* extends to form the U-shaped third source electrode 173*c*. A wide end portion 177*c* of the third drain electrode 175*c* overlaps the capacitor electrode 137 to form a step-down capacitor (Cstd), and the bar-type end portion of the third drain electrode 175*c* is partially surrounded by the third source electrode 173*c*.

The first gate electrode 124*h*, the first source electrode 173*h*, and the first drain electrode 175*h*, together with the first semiconductor 154*h*, collectively constitute a first thin film transistor (Qh). The second gate electrode 124*l*, the second source electrode 173*l*, and the second drain electrode 175*l*, together with the second semiconductor 154*l*, collectively constitute a second thin film transistor (Ql). The third gate electrode 124*c*, the third source electrode 173*c*, and the third drain electrode 175*cm*, together with the third semiconductor 154*c*, collectively constitute a third thin film transistor (Qc).

The first semiconductor 154*h*, the second semiconductor 154*l*, and the third semiconductor 154*c* can be connected to each other to form a linear shape. In particular, the first semiconductor 154*h*, the second semiconductor 154*l*, and the third semiconductor 154*c* may be formed having substantially a same planar shape as the data conductors 171, 173*h*, 173*l*, 173*c*, 175*h*, 175*l*, and 175*c* and the ohmic contacts below the data conductors (except at a channel region between the source electrodes 173*h*, 173*l*, and 173*c* and the drain electrodes 175*h*, 175*l*, and 175*c*).

A portion of the first semiconductor 154*h* is not covered by the first source electrode 173*h* and the first drain electrode 175*h* (i.e. a portion of the first semiconductor 154*h* is exposed between the first source electrode 173*h* and the first drain electrode 175*h*). Similarly, a portion of the second semiconductor 154*l* is not covered by the second source electrode 173*l* and the second drain electrode 175*l* (i.e. a portion of the second semiconductor 154*l* is exposed between the second source electrode 173*l* and the second drain electrode 175*l*). Likewise, a portion of the third semiconductor 154*c* is not covered by the third source electrode 173*c* and the third drain electrode 175*c* (i.e. a portion of the third semiconductor 154*c* is exposed between the third source electrode 173*c* and the third drain electrode 175*c*).

Referring to FIGS. 2-4, a passivation layer 180 is formed on the data conductors 171, 173*h*, 173*l*, 173*c*, 175*h*, 175*l*, and 175*c*, and on the exposed portions of the semiconductors 154*h*, 154*l*, and 154*c* between the source electrodes 173*h*, 173*l*, and 173*c* and the drain electrodes 175*h*, 175*l*, and 175*c*. The passivation layer 180 may be formed of an organic insulating material or an inorganic insulating material. The passivation layer 180 may be formed as a single layer, or as a multi-layered structure comprising multiple layers.

A color filter 230 is formed in the pixel area (PX) on the passivation layer 180. Each color filter 230 is capable of displaying one of primary colors (such as red, green, or blue). However, the color filter 230 is not limited to the three primary colors red, green, and blue. In some embodiments, the color filter 230 can also display cyan, magenta, yellow, and white-based colors. In some embodiments (not shown), the color filter 230 can extend in the column direction along the neighboring data lines 171.

A light blocking member 220 is formed in a region between neighboring color filters 230. The light blocking member 220 is formed on a boundary of the pixel area (PX) and the thin film transistor so as to prevent light leakage. The light blocking member 220 extends along the gate line 121 and upward and downward from the step-down gate line 123. The light blocking member 220 includes a horizontal light blocking member 220*a* covering a region in which the first thin film transistor (Qh), the second thin film transistor (Ql), and the third thin film transistor (Qc) are disposed. The light blocking member 220 further includes a vertical light blocking member 220*b* extending along the data line 171. That is, the horizontal light blocking member 220*a* may be formed in the first valley (V1), and the vertical light blocking member 220*b* may be formed in the second valley (V2). The color filter 230 may overlap the light blocking member 220 in a predetermined region.

A first insulating layer 240 may be formed on the color filter 230 and the light blocking member 220. The first insulating layer 240 may be formed of an inorganic insulating material (such as silicon nitride (SiNx), silicon oxide (SiO$_x$), or silicon oxynitride (SiO$_x$N$_y$)). The first insulating layer 240 serves to protect the color filter 230 and the light blocking member 220. In some particular embodiments, the first insulating layer 240 may be omitted.

A plurality of first contact holes 185*h* and second contact holes 185*l* are formed on the first insulating layer 240, the light blocking member 220, and the passivation layer 180. The first contact holes 185*h* expose a wide end portion of the first drain electrode 175*h*, and the second contact holes 185*l* expose a wide end portion of the second drain electrode 175*l*.

A pixel electrode 191 is formed on the first insulating layer 240. The pixel electrode 191 can be formed of a transparent metallic material (such as indium-tin oxide (ITO) or indium-zinc oxide (IZO)).

The pixel electrode 191 includes a first sub-pixel electrode 191*h* and a second sub-pixel electrode 191*l* separated from each other with the gate line 121 and the step-down gate line 123 interposed therebetween. The first sub-pixel electrode 191h and the second sub-pixel electrode 191l are disposed at a top and a bottom of the pixel area PX with respect to the gate line 121 and the step-down gate line 123, and neighbor each other in the column direction. That is, the first sub-pixel electrode 191h is separated from the second sub-pixel electrode 191l with the first valley (V1) disposed therebetween, the first sub-pixel electrode 191h is disposed in the first sub-pixel area (PXa), and the second sub-pixel electrode 191l is disposed in the second sub-pixel area (PXb).

The first sub-pixel electrode 191h and the second sub-pixel electrode 191l are connected to the first drain electrode 175h and the second drain electrode 175l through the first contact hole 185h and the second contact hole 185l, respectively. As such, when the first thin film transistor (Qh) and the second thin film transistor (Ql) are turned on, they receive a data voltage from the first drain electrode 175h and the second drain electrode 175l, respectively.

The first sub-pixel electrode 191h and the second sub-pixel electrode 191l have a quadrangular shape. The first sub-pixel electrode 191h and the second sub-pixel electrode 191l include a cross stem having horizontal stems 193h and 193l and vertical stems 192h and 192l crossing the horizontal stems 193h and 193l. The first sub-pixel electrode 191h and the second sub-pixel electrode 191l also include a plurality of minute branches 194h and 194l and protrusions 197h and 197l protruding upward or downward from the edges of the sub-pixel electrodes 191h and 191l.

The pixel electrode 191 is divided into four sub-regions by the horizontal stems 193h and 193l and the vertical stems 192h and 192l. The minute branches 194h and 194l extend obliquely from the horizontal stems 193h and 193l and the vertical stems 192h and 192l, at an angle of about 45 degrees or about 135 degrees with respect to the gate line 121 or the horizontal stems 193h and 193l. In some embodiments, the minute branches 194h and 194l of two neighboring sub-regions may be arranged orthogonal to each other.

The first sub-pixel electrode 191h further includes an outer stem surrounding an outer part of the first sub-pixel electrode 191h. The second sub-pixel electrode 191l further includes a horizontal unit disposed at an upper end and a lower end of the second sub-pixel electrode 191l, and a left/right vertical unit 198 disposed at the left and right of the first sub-pixel electrode 191h. The left/right vertical unit 198 can prevent capacitive coupling between the data line 171 and the first sub-pixel electrode 191h.

It should be noted that the structure of the thin film transistor and the shape of the pixel electrode described above are merely exemplary, and that the inventive concept is not limited thereto. One of ordinary skill in the art would appreciate that the above-described embodiments and configurations may be modified in various ways.

A common electrode 270 is formed on the pixel electrode 191, and spaced apart from the pixel electrode 191 by a predetermined distance. A microcavity 305 is formed between the pixel electrode 191 and the common electrode 270. That is, the microcavity 305 is surrounded by the pixel electrode 191 and the common electrode 270. It should be noted that a width and an area of the microcavity 305 may be modified accordingly depending on a required resolution of the display device.

The common electrode 270 may be formed of a transparent metal material (such as indium tin oxide (ITO) or indium zinc oxide (IZO)). A predetermined voltage may be applied to the common electrode 270, and an electric field may be generated between the pixel electrode 191 and the common electrode 270.

The common electrode 270 is formed directly in contact with the first insulating layer 240 at the second valley (V2), and may be formed covering a left side and a right side of the microcavity 305. That is, the common electrodes 270 are connected to each other along the plurality of pixel rows. Since the microcavity 305 is formed above a portion of the common electrode 270 disposed at the second valley (V2), a height of the portion of the common electrode 270 disposed at the second valley (V2) may be less than a height of another portion of the common electrode 270 disposed in the pixel area (PX).

In some embodiments, the common electrode 270 is not formed in a partial region of the first valley (V1). That is, the common electrode 270 does not cover a portion of the upper side and the lower side of the pixel area (PX), and thus a portion of the microcavity 305 is exposed to the outside. The portion where the microcavity 305 is exposed to the outside is called a liquid crystal injection hole 307. The liquid crystal injection hole 307 is formed at the first valley (V1), and a liquid crystal material is injected into the microcavity 307 through the liquid crystal injection hole 307.

As mentioned above, the common electrode 270 covers the left side and the right side of the microcavity 305, but does not cover at least a portion of the upper side and the lower side of the pixel area (PX). However, the inventive concept is not limited to the above-described embodiment. In some embodiments, the common electrode 270 may be formed covering another side of the microcavity 305. For example, the common electrode 270 may be formed covering the upper side and the lower side of the microcavity 305, but does not cover a portion of the left side and the right side of the pixel area (PX). In this case, the liquid crystal injection hole 307 may be formed at the second valley (V2).

A liquid crystal layer comprising liquid crystal molecules 310 is formed in the microcavity 305 disposed between the pixel electrode 191 and the common electrode 270. The liquid crystal molecules 310 have negative dielectric anisotropy, and may align in a direction perpendicular to a surface of the substrate 110 in the absence of an electric field. That is, vertical alignment of the liquid crystal molecules 310 may be performed when an electric field is not applied.

A first alignment layer 11 is formed on the pixel electrode 191. The first alignment layer 11 may also be formed on a portion of the first insulating layer 240 that is not covered by the pixel electrode 191.

A second alignment layer 21 is formed below the common electrode 270 facing the first alignment layer 11.

The first alignment layer 11 and the second alignment layer 21 may correspond to vertical alignment layers, and may be formed of materials such as polyamic acid, polysiloxane, or polyimide. The first and second alignment layers 11 and 21 may be connected to each other at the edge of the pixel area (PX).

An electric field is generated by the first subpixel electrode 191h and the second subpixel electrode 191l (to which the data voltages are applied) and the common electrode 270. The electric field controls the directions of the liquid crystal molecules 310 disposed in the microcavity 305 between the two electrodes 191 and 270.

Consequently, the luminance of light passing through the liquid crystal layer can vary according to the directions of the liquid crystal molecules 310.

A second insulating layer 350 may be formed on the common electrode 270. The second insulating layer 350 may be formed of an inorganic insulating material (such as silicon nitride (SiNx), silicon oxide ($SiO_x$), or silicon oxynitride ($SiO_xN_y$)). In some particular instances, the second insulating layer 350 may be omitted.

A roof layer 360 is formed on the second insulating layer 350. The roof layer 360 may be formed of an organic material. The microcavity 305 is formed below the roof layer 360, and a shape of the microcavity 305 may be maintained by the roof layer 360.

Similar to the common electrode 270, the roof layers 360 are connected to each other along the plurality of pixel rows. The liquid crystal injection hole 307 is formed along the first valley (V1) in the roof layer 360 and thus a portion of the microcavity 305 is exposed to the outside.

In manufacturing a conventional liquid crystal display, liquid crystal is typically applied at a liquid crystal injection hole and injected into the microcavity after the formation of the roof layer. In some instances, some of the liquid crystal may remain on the roof layer, thereby causing light leakage.

To reduce the light leakage, a hydrophobic treatment is applied to a top surface of the roof layer, and the remaining liquid crystal is then removed using an air blowing method. However, in some instances, the liquid crystal injection hole may be inadvertently subject to the hydrophobic treatment, causing the liquid crystal injection hole to be hydrophobic, which subsequently interferes with the injection of the liquid crystal into the microcavity. Furthermore, in some instances, the hydrophobic chemical surface treatment on the roof layer surface may cause defects in the alignment layer of the microcavity.

The inventive concept can overcome the above issues relating to existing hydrophobic treatments, by providing a hydrophobic layer 380 including a plurality of protrusions 384 on the roof layer 360.

The protrusions 384 of the hydrophobic layer 380 are formed by a nanoimprint process. In some embodiments, a single protrusion 384 is formed having a size ranging from about several hundred nanometers to about several micrometers. Further, as shown in FIGS. 3 and 4, the protrusions 384 can be formed in series as a single protrusion body. In this instance, the protrusions 384 can form a nanopattern having a constant size and pitch.

Each protrusion 384 has a constant height with respect to a top surface of the roof layer 360 and forms a predetermined angle with the top surface of the roof layer 360. In some embodiments, an angle between one side of the protrusion 384 and the top surface of the roof layer 360 may be substantially greater than 70 degrees. In some other embodiments, an angle between one side of the protrusion 384 and the top surface of the roof layer 360 may be substantially greater than 100 degrees. When the liquid crystal is applied to the top surface of the roof layer 360 and a contact angle is greater than 70 degrees, the remaining liquid crystal can then be easily removed from the top surface of the roof layer 360. As such, the protrusions 384 allow the remaining liquid crystal to be easily removed.

Since the inventive concept does not require performing a hydrophobic chemical surface treatment, only the top surface of the hydrophobic layer 380 is hydrophobic, whereas the surfaces in the microcavity 305 and the liquid crystal injection hole 307 are hydrophilic. Accordingly, the liquid crystal can be injected smoothly into the microcavity 305 (due to the hydrophilic surfaces). Also, the integrity of the alignment layers 11 and 21 is maintained since the alignment layers are not subject to any hydrophobic chemical surface treatment.

As described above, the protrusions 384 can be formed through a nanoimprint process. Nevertheless, those skilled in the art would readily appreciate that any other appropriate methods can be used to form the hydrophobic protrusions 384.

In forming a plurality of protrusions 384 through an imprint process, the hydrophobic layer 380 may include an imprint resin (such as polymethyl methacrylate (PMMA), an acryl-based resin, or an acrylate-based resin). In some other embodiments, the hydrophobic layer 380 may include a same material as an overcoat 390. When the hydrophobic layer 380 is formed of the same material as the overcoat 390, the adhesion between the hydrophobic layer 380 and the overcoat 390 can be improved.

A third insulating layer 370 may be formed on the hydrophobic layer 380. The third insulating layer 370 may be formed of an inorganic insulating material (such as silicon nitride (SiNx), silicon oxide ($SiO_x$), or silicon oxynitride ($SiO_xN_y$)). The third insulating layer 370 may be formed covering the upper side and the lateral sides of the roof layer 360. The third insulating layer 370 serves to protect the roof layer 360. In some particular embodiments, the third insulating layer 370 may be omitted.

The overcoat 390 may be formed on the third insulating layer 370. The overcoat 390 is formed covering the liquid crystal injection hole 307 (where a portion of the microcavity 305 is exposed to the outside). That is, the overcoat 390 may seal the microcavity 305 such that the liquid crystal molecules 310 formed in the microcavity 305 are not discharged to the outside. Since the overcoat 390 comes into contact with the liquid crystal molecules 310, the overcoat 390 may be formed of a material that does not react with the liquid crystal molecules 310. For example, the overcoat 390 may be formed of parylene or other similar materials.

The overcoat 390 may be formed as a multilayer structure (such as a double layer or a triple layer structure). The double layer structure includes two layers formed of different materials. The triple layer structure includes three layers, and the materials in adjacent layers are different from each other. For example, the overcoat 390 may include a layer formed of an organic insulating material or a layer formed of an inorganic insulating material.

Although not illustrated, polarizers may be formed on the upper and lower surfaces of the display device. The polarizers may include a first polarizer and a second polarizer. The first polarizer may be attached onto the lower side of the substrate 110, and the second polarizer may be attached onto the overcoat 390.

Next, a method for manufacturing a display device according to an exemplary embodiment of the inventive concept will be described with reference to FIGS. 5 to 9.

Specifically, FIGS. 5 to 9 show cross-sectional views of the display device along line III-III of FIG. 1 at different stages of fabrication.

First, a gate line 121 and a step-down gate line 123 are formed extending in a first direction on a substrate 110. The substrate 110 may be formed of glass or plastic. A first gate electrode 124*h*, a second gate electrode 124*l*, and a third gate electrode 124*c* protruding from the gate line 121 are also formed on the substrate 110.

A storage electrode line 131 may be formed on the substrate 110, such that the storage electrode line 131 is spaced apart from the gate line 121, the step-down gate line 123, and the first to third gate electrodes 124*h*, 124*l*, and 124*c*.

Next, a gate insulating layer 140 is formed over the entire surface of the substrate 110 (i.e. on the gate line 121, the step-down gate line 123, the first to third gate electrodes 124h, 124l, and 124c, and the storage electrode line 131). The gate insulating layer 140 may be formed of an inorganic insulating material (such as silicon oxide (SiOx), silicon nitride (SiNx), or silicon oxynitride (SiO$_x$N$_y$)). The gate insulating layer 140 may be formed as a single layer, or as a multi-layered structure comprising multiple layers.

Next, a first semiconductor 154h, a second semiconductor 154l, and a third semiconductor 154c are formed on the gate insulating layer 140. The first, second, and third semiconductors 154h, 154l, and 154c may be formed by depositing a semiconductor material (such as amorphous silicon, polycrystalline silicon, or a metal oxide) and subsequently patterning the semiconductor material. The first semiconductor 154h may be disposed on the first gate electrode 124h, the second semiconductor 154l may be disposed on the second gate electrode 124l, and the third semiconductor 154c may be disposed on the third gate electrode 124c.

A data line 171 is formed extending in a second direction on the gate insulating layer 140. The data line 171 may be formed by depositing a metallic material and subsequently patterning the metallic material. The metallic material may be formed as a single layer, or as a multi-layered structure comprising multiple layers.

Next, a first source electrode 173h protruding above the first gate electrode 124h from the data line 171 and a first drain electrode 175h spaced apart from the first source electrode 173h are formed together. A second source electrode 173l connected with the first source electrode 173h and a second drain electrode 175l spaced apart from the second source electrode 173l are formed together. A third source electrode 173c extending from the second drain electrode 175l and a third drain electrode 175c spaced apart from the third source electrode 173c are formed together.

The first to third semiconductors 154h, 154l, and 154c, the data line 171, the first to third source electrodes 173h, 173l, and 173c, and the first to third drain electrodes 175h, 175l, and 175c may be formed by sequentially depositing a semiconductor material and a metallic material, and then patterning the semiconductor material and the metallic material at the same time. In this case, the first semiconductor 154h may be formed extending to the lower portion of the data line 171.

The first gate electrode 124h, the first source electrode 173h, and the first drain electrode 175h, together with the first semiconductor 154h, collectively constitute a first thin film transistor (Qh). The second gate electrode 124l, the second source electrode 173l, and the second drain electrode 175l, together with the second semiconductor 154l, collectively constitute a second thin film transistor (Ql). The third gate electrode 124c, the third source electrode 173c, and the third drain electrode 175cm, together with the third semiconductor 154c, collectively constitute a third thin film transistor (Qc).

A passivation layer 180 is formed on the data line 171, the first to third source electrodes 173h, 173l, and 173c, the first to third drain electrodes 175h, 175l, and 175c, and on the exposed portions of the semiconductors 154h, 154l, and 154c between the source electrodes 173h/173l/173c and the drain electrodes 175h/175l/175c. The passivation layer 180 may be formed of an organic insulating material or an inorganic insulating material. The passivation layer 180 may be formed as a single layer, or as a multi-layered structure comprising multiple layers.

A color filter 230 is formed on the passivation layer 180 in each pixel area PX. The color filters 230 having a same color may be formed in a column direction of the plurality of pixel areas (PXs). When forming color filters 230 having three colors, a first colored color filter 230 may be formed and a second colored color filter 230 may be subsequently formed by shifting a mask. Similarly, a third colored color filter 230 may be formed by shifting a mask after forming the second colored color filter 230.

A light blocking member 220 is formed on a boundary of each pixel area PX on the passivation layer 180 and the thin film transistor.

As described above, the light blocking member 220 is formed after forming the color filters 230, but the inventive concept is not limited thereto. In some embodiments, the light blocking member 220 may be formed before forming the color filters 230.

A first insulating layer 240 is formed on the color filter 230 and the light blocking member 220. The first insulating layer 240 may be formed of an inorganic insulating material (such as silicon nitride (SiNx), silicon oxide (SiO$_x$), or silicon oxynitride (SiO$_x$N$_y$)).

A first contact hole 185h and a second contact hole 185l are formed by etching the passivation layer 180, the light blocking member 220, and the first insulating layer 240, so as to expose a portion of each of the first drain electrode 175h and the second drain electrode 175l.

A first subpixel electrode 191h is formed in the first subpixel area PXa and a second subpixel electrode 191l is formed in the second subpixel area PXb. The first subpixel electrode 191h and the second subpixel electrode 191l are formed by depositing and patterning a transparent metal material (such as indium tin oxide (ITO) or indium zinc oxide (IZO)) on the first insulating layer 240. The first subpixel electrode 191h and the second subpixel electrode 191l are separated from each other with the first valley (V1) interposed therebetween. The first subpixel electrode 191h is connected with the first drain electrode 175h through the first contact hole 185h, and the second subpixel electrode 191l is connected with the second drain electrode 175l through the second contact hole 185l.

Horizontal stems 193h and 193l, and vertical stems 192h and 192l crossing the horizontal stems 193h and 193l, are formed in the first subpixel electrode 191h and the second subpixel electrode 191l, respectively. Further, a plurality of minute branches 194h and 194l are formed extending obliquely from the horizontal stems 193h and 193l and the vertical stems 192h and 192l.

Figure 6:
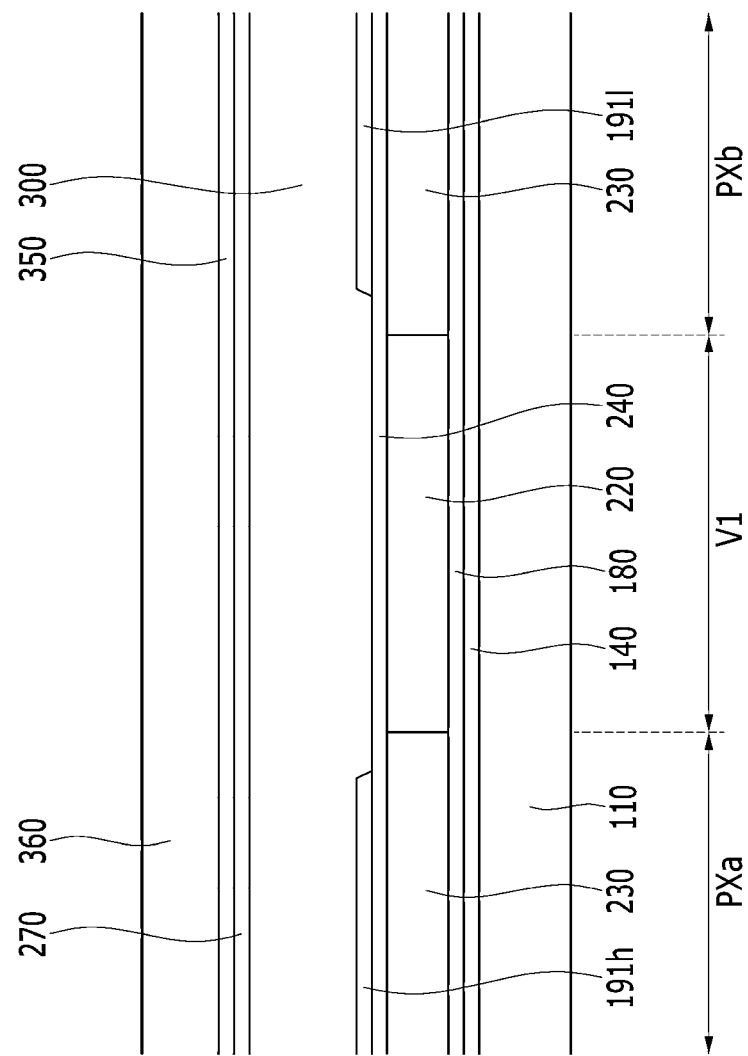

As shown in FIG. 6, a sacrificial layer 300 is formed by coating a photosensitive organic material on the pixel electrode 191 and patterning the photosensitive organic material through a photolithography process.

The sacrificial layers 300 are connected to each other along the plurality of pixel columns. That is, a sacrificial layer 300 is formed covering each pixel area (PX) and the first valley (V1) disposed between the first subpixel area (PXa) and the second subpixel area (PXb).

A common electrode 270 is formed by depositing a transparent metal material (such as indium tin oxide (ITO) or indium zinc oxide (IZO)) on the sacrificial layer 300.

A second insulating layer 350 may be formed on the common electrode 270. The second insulating layer 350 may be formed of an inorganic insulating material (such as silicon oxide, silicon nitride, or silicon oxynitride). A roof layer 360 is formed on the second insulating layer 350. The roof layer 360 may be formed of an organic material.

Figure 7:
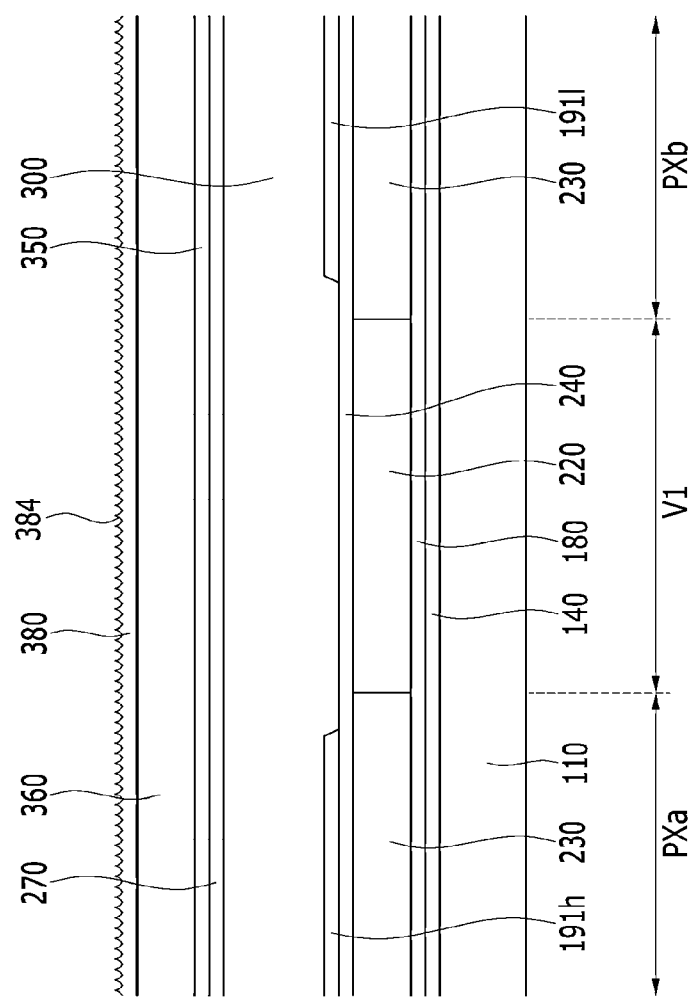

As shown in FIG. 7, a hydrophobic layer 380 including a plurality of protrusions 384 is formed on the top surface of the roof layer 360.

As previously mentioned, in manufacturing a conventional liquid crystal display, liquid crystal is applied at the liquid crystal injection hole and injected into the microcavity after the formation of the roof layer. However, in some instances, some of the liquid crystal may remain on the roof layer and cause light leakage.

To reduce the light leakage, a hydrophobic treatment may be applied to a top surface of the roof layer, and the remaining liquid crystal may then be removed using an air blowing method. However, in some instances, the liquid crystal injection hole may be inadvertently subject to the hydrophobic treatment, causing the surface of the liquid crystal injection hole to be hydrophobic, which then interferes with the injection of the liquid crystal into the microcavity. Furthermore, in some instances, the hydrophobic chemical surface treatment on the roof layer may cause defects in the alignment layers in the microcavity.

The inventive concept can overcome the above issues relating to existing hydrophobic treatments, by forming the hydrophobic layer 380 including a plurality of protrusions 384 on the surface of the roof layer 360.

The protrusions 384 may be formed by a nanoimprint process. In some embodiments, a single protrusion 384 may be formed having a size ranging from about several hundred nanometers to about several micrometers.

The nanoimprint process includes applying a resin to an imprint mold, and printing the molded resin on the top surface of the roof layer 360. The printed/molded resin is then cured by heat hardening or UV hardening, so as to yield the protrusions profile shown in FIG. 7.

As shown in FIG. 7, a plurality of protrusions 384 can be formed in series as a single protrusion body. In this instance, the protrusions 384 can form a nanopattern having a constant size and pitch.

As described above, the protrusions 384 can be formed through a nanoimprint process. Nevertheless, those skilled in the art would readily appreciate that any other appropriate methods can be used to form the protrusions 384.

The protrusions 384 have a constant height with respect to the top surface of the roof layer 360. Each protrusion 384 forms a predetermined angle with the top surface of the roof layer 360. In some embodiments, an angle between one side of the protrusion 384 and the top surface of the roof layer 360 may be substantially greater than 70 degrees. In some other embodiments, an angle between one side of the protrusion 384 and the top surface of the roof layer 360 may be substantially greater than 100 degrees. When the liquid crystal is applied to the top surface of the roof layer 360 and a contact angle is greater than 70 degrees, the remaining liquid crystal can then be easily removed from the top surface of the roof layer 360. Accordingly, the protrusions 384 allow the remaining liquid crystal to be easily removed.

Since the inventive concept does not require performing a hydrophobic chemical surface treatment, only the top surface of the hydrophobic layer 380 is hydrophobic, whereas the surfaces of the microcavity 305 and the liquid crystal injection hole 307 are hydrophilic. Accordingly, the liquid crystal can be injected smoothly into the microcavity 305 (due to the hydrophilic surfaces). Also, the integrity of the alignment layers 11 and 21 is maintained since the alignment layers are not subject to a hydrophobic chemical surface treatment.

In forming a plurality of protrusions 384 through an imprint process, the hydrophobic layer 380 may include an imprint resin (such as polymethyl methacrylate (PMMA), an acryl-based resin, or an acrylate-based resin). In some other embodiments, the hydrophobic layer 380 may include a same material as an overcoat 390. When the hydrophobic layer 380 is formed of the same material as the overcoat 390, the adhesion between the hydrophobic layer 380 and the overcoat 390 can be improved.

Figure 8:
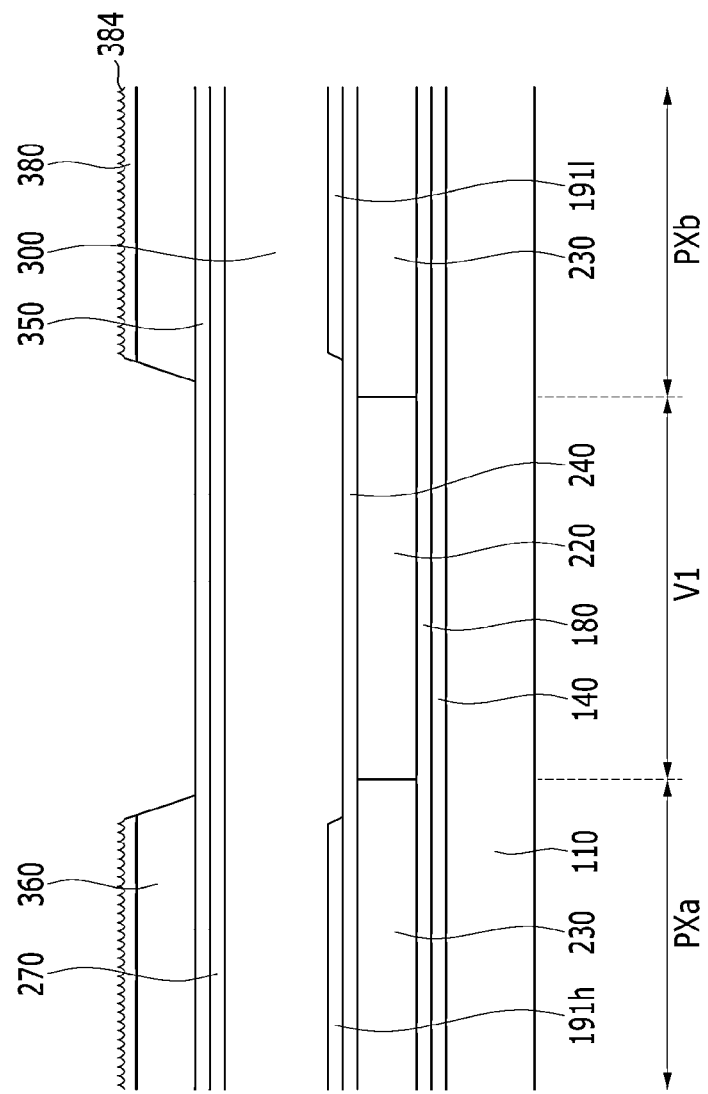

As shown in FIG. 8, the hydrophobic layer 380 including the plurality of protrusions 384 and the roof layer 360 are patterned, so as to expose a portion of the second insulating layer 350.

Figure 9:
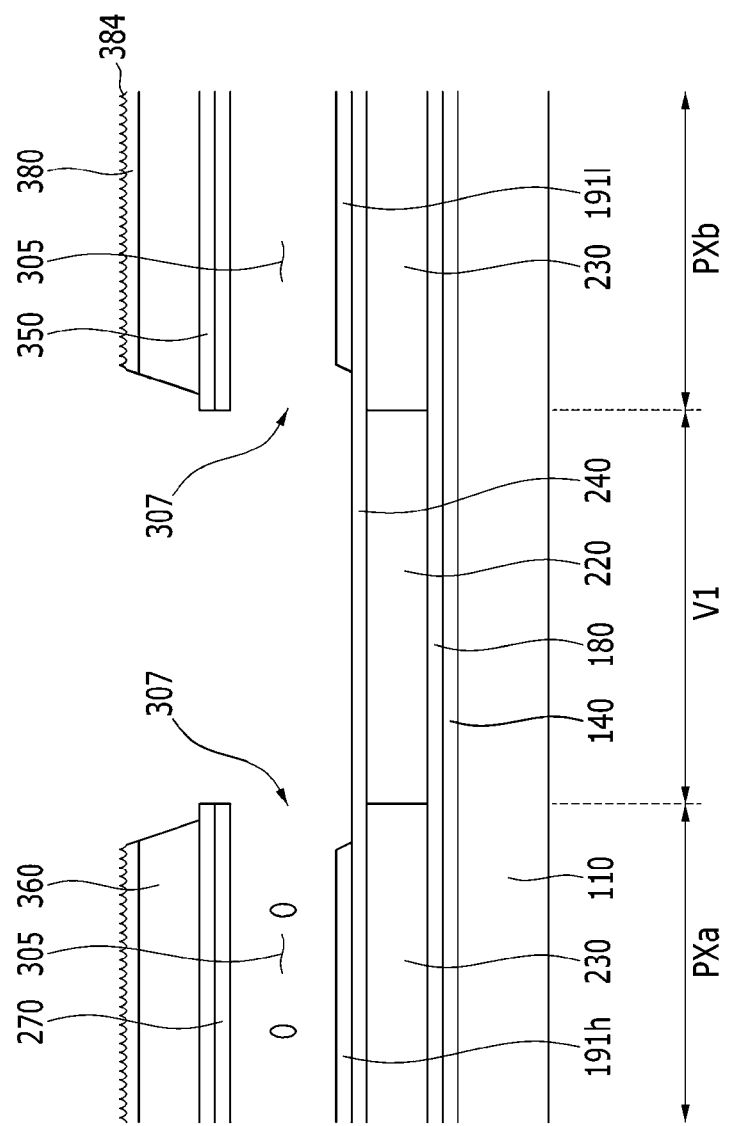

Referring to FIG. 9, the second insulating layer 350 and the common electrode 270 are patterned with respect to the patterned roof layer 360 and the hydrophobic layer 380, thereby exposing the sacrificial layer 300 (below the removed portion of the common electrode 270).

The sacrificial layer 300 is then removed by applying a developer on the region of the substrate 110 where the sacrificial layer 300 is exposed. Alternatively, in some embodiments, the sacrificial layer 300 may be removed by an ashing process.

When the sacrificial layer 300 is removed, the microcavity 305 is formed in the space (where the sacrificial layer 300 was originally disposed).

The pixel electrode 191 and the common electrode 270 are spaced apart from each other with the microcavity 305 interposed therebetween, and the pixel electrode 191 and the roof layer 360 are spaced apart from each other with the microcavity 305 interposed therebetween. The common electrode 270 and the roof layer 360 are formed covering the top and lateral sides of the microcavity 360.

The microcavity 305 is exposed to the outside at a portion where the roof layer 360 and the common electrode 270 are removed (i.e. at the liquid crystal injection hole 307). The liquid crystal injection hole 307 is formed at the first valley (V1). In some embodiments, the liquid crystal injection hole 307 may be formed at the second valley (V2) instead of the first valley (V1).

The roof layer 360 is cured by applying heat to the substrate 110. The shape of the microcavity 305 is maintained by the cured roof layer 360.

When an aligning agent containing an alignment material is applied on the substrate 110 by a spin coating method or an inkjet method, the aligning agent is injected into the microcavity 305 through the liquid crystal injection hole 307. A curing process is then performed to evaporate a solution component of the aligning agent, such that the alignment material remains on an inner wall of the microcavity 305.

Accordingly, a first alignment layer 11 may be formed on the pixel electrode 191, and a second alignment layer 21 may be formed below the common electrode 270. The first alignment layer 11 and the second alignment layer 21 face each other with the microcavity 305 interposed therebetween, and are connected to each other at the edge of the pixel area (PX).

In this case, the first and second alignment layers 11 and 21 may be aligned in a direction perpendicular to the first substrate 110 (vertical alignment) except at the side of the microcavity 305. In some embodiments, a process of irradiating UV light to the first and second alignment layers 11 and 21 is performed, and as a result, the first and second alignment layers 11 and 21 may be aligned in a direction parallel to the surface of the substrate 110 (horizontal alignment).

When the liquid crystal material comprising the liquid crystal molecules 310 is applied on the substrate 110 by an inkjet method or a dispensing method, the liquid crystal material is injected into the microcavity 305 through the liquid crystal injection hole 307. In some embodiments, the liquid crystal material may be applied at the liquid crystal injection holes 307 formed along the odd-numbered first valleys (V1), and is not applied in the liquid crystal injection holes 307 formed along the even-numbered first valleys (V1). In some other embodiments, the liquid crystal material may be applied in the liquid crystal injection holes 307 formed along the even-numbered first valleys (V1), and is not applied in the liquid crystal injection holes 307 formed along the odd-numbered first valleys (V1).

When the liquid crystal material is applied in the liquid crystal injection holes 307 formed along the odd-numbered first valleys V1, the liquid crystal material flows through the liquid crystal injection holes 307 by capillary force into the microcavity 305. In this case, air is discharged from the microcavity 305 through the liquid crystal injection holes 307 formed along the even-numbered first valleys (V1).

In some other embodiments, the liquid crystal material may be applied in all the liquid crystal injection holes 307. That is, the liquid crystal material may be applied in the liquid crystal injection holes 307 formed along the odd-numbered first valleys (V1) and the liquid crystal injection holes 307 formed along the even-numbered first valleys (V1).

Referring back to FIG. 3, a third insulating layer 370 is formed on the hydrophobic layer 380, and an overcoat 390 is formed on the third insulating layer 370. The overcoat 390 is formed of a material that does not react with the liquid crystal molecules 310 on the third insulating layer 370. The overcoat 390 is formed covering the liquid crystal injection hole 307 so as to seal the microcavity 305.

Although not illustrated in the drawings, polarizers may be formed on the upper and lower sides of the display device. The polarizers may include a first polarizer and a second polarizer. The first polarizer may be attached onto the lower side of the substrate 110, and the second polarizer may be attached onto the overcoat 390.

Figure 10:
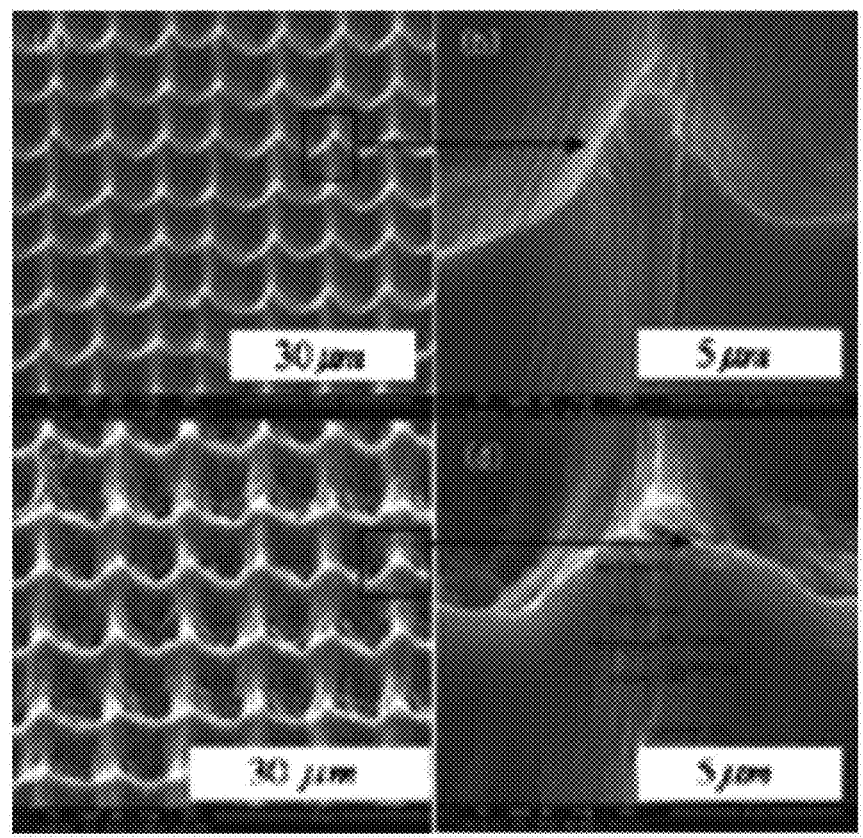
FIGS. 10 to 12 are images of the protrusions of a hydrophobic layer according to an exemplary embodiment of the inventive concept.
Figure 11:
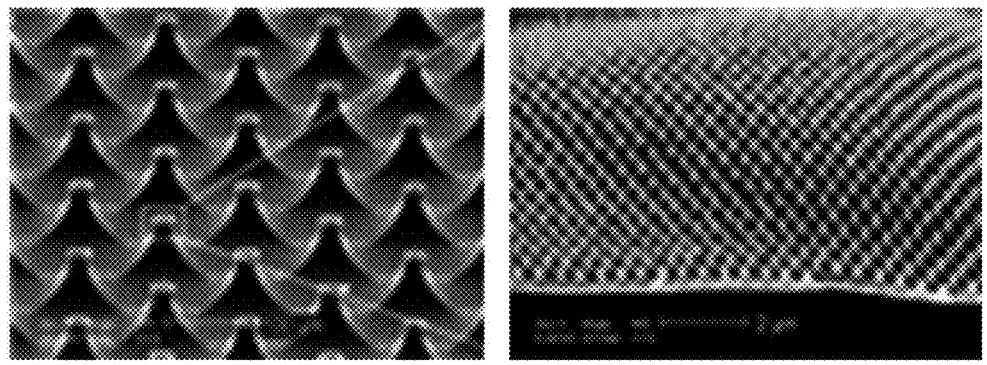
Figure 12:
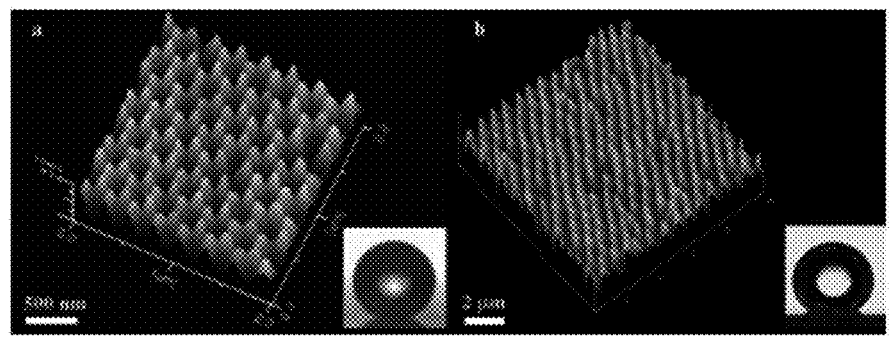

FIGS. 10 to 12 are images of the protrusions on a hydrophobic layer according to an exemplary embodiment of the inventive concept. The protrusions may be formed using a nanoimprint process. As shown in FIGS. 10 to 12, a single protrusion may range from about several hundred nanometers to about several micrometers. In some embodiments, the angle of a protrusion with respect to the surface of the roof layer may be greater than about 70 degrees, so as to prevent liquid crystal from remaining on the hydrophobic layer.

According to the inventive concept, an exemplary roof layer including the hydrophobic protrusions can prevent liquid crystal from remaining on the roof layer, thereby preventing light leakage. The inventive concept also eliminates the need to apply a chemical hydrophobic treatment to the surface of the roof layer. As a result, the flow of the liquid crystal through the liquid crystal injection hole into the microcavity is improved, and also the integrity of the alignment layers can be maintained.

In addition, the inventive concept allows the weight, form factor, and processing time and costs of the display device to be reduced, since the exemplary display device is fabricated on a single substrate.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the present disclosure.

What is claimed is:

1. A display device comprising:
   a substrate including a plurality of pixel areas;
   a thin film transistor disposed on the substrate;
   a pixel electrode connected to the thin film transistor;
   a common electrode separated from the pixel electrode with a microcavity interposed therebetween;
   a roof layer disposed on the common electrode;
   a hydrophobic layer disposed on the roof layer and including a plurality of protrusions;
   an injection hole disposed in the common electrode, the hydrophobic layer and the roof layer, the injection hole exposing a portion of the microcavity;
   a liquid crystal layer for filling the microcavity; and
   an overcoat disposed on the roof layer and covering the injection hole, so as to seal the microcavity.

2. The display device of claim 1, wherein the protrusions render a surface of the hydrophobic layer hydrophobic.

3. The display device of claim 2, wherein a surface of the microcavity is hydrophilic.

4. The display device of claim 1, wherein an angle between the protrusions and a top surface of the roof layer is substantially greater than about 70 degrees.

5. The display device of claim 1, wherein the protrusions form a predetermined nanopattern.

6. The display device of claim 1, wherein the protrusions and the overcoat are formed of a same material.

7. The display device of claim 1, wherein a material of the protrusions includes an imprint resin.

8. The display device of claim 1, further comprising a first insulating layer disposed on the thin film transistor and a second insulating layer disposed on the common electrode, wherein the second insulating layer includes at least one of silicon nitride, silicon oxide, and silicon oxynitride.

9. The display device of claim 8, further including a third insulating layer disposed on the roof layer.

10. The display device of claim 9, wherein the third insulating layer includes at least one of silicon nitride, silicon oxide, and silicon oxynitride.

* * * * *